United States Patent
Best et al.

(10) Patent No.: US 9,195,754 B2
(45) Date of Patent: Nov. 24, 2015

(54) EXPANSION OF SEARCH RESULT INFORMATION

(75) Inventors: Steven F. Best, Acton, MA (US); Robert J. Eggers, Jr., Austin, TX (US); Janice M. Girouard, Austin, TX (US); Peter A. Zannucci, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 12/139,345

(22) Filed: Jun. 13, 2008

(65) Prior Publication Data

US 2009/0313220 A1 Dec. 17, 2009

(51) Int. Cl.
*G06F 17/30* (2006.01)

(52) U.S. Cl.
CPC .... *G06F 17/30867* (2013.01); *G06F 17/30672* (2013.01)

(58) Field of Classification Search
CPC .................................................. G06F 17/30672
USPC ................... 707/3, 5, 765; 715/821, 738, 711
See application file for complete search history.

(56) References Cited

U.S. PATENT DOCUMENTS

| | | | |
|---|---|---|---|
| 5,995,101 A * | 11/1999 | Clark et al. .................... | 715/711 |
| 6,199,077 B1 | 3/2001 | Inala et al. | |
| 6,412,073 B1 | 6/2002 | Rangan | |
| 6,725,425 B1 | 4/2004 | Rajan et al. | |
| 6,976,215 B1 | 12/2005 | Roderick et al. | |
| 7,752,237 B2 * | 7/2010 | Ray ............................... | 707/805 |
| 2004/0205514 A1 | 10/2004 | Sommerer et al. | |
| 2006/0095424 A1 * | 5/2006 | Petropoulos et al. ............. | 707/3 |
| 2006/0107234 A1 * | 5/2006 | Tudor et al. .................... | 715/821 |
| 2007/0239662 A1 | 10/2007 | Fontes et al. | |
| 2008/0091663 A1 | 4/2008 | Inala et al. | |
| 2008/0092054 A1 | 4/2008 | Bhumkar et al. | |
| 2008/0148188 A1 * | 6/2008 | Read .............................. | 715/841 |
| 2008/0235594 A1 * | 9/2008 | Bhumkar et al. ............. | 715/738 |
| 2009/0313020 A1 * | 12/2009 | Koivunen ...................... | 704/260 |

\* cited by examiner

*Primary Examiner* — Apu Mofiz
*Assistant Examiner* — Chelcie Daye
(74) *Attorney, Agent, or Firm* — Kunzler Law Group; Damion Josephs

(57) ABSTRACT

Generally speaking embodiments that dynamically expand the amount of information displayed with search or query results are disclosed. Some embodiments comprise a method for viewing information of a search that includes presenting a number of search results in response to a search, enabling a user to select one or more of the search results for a period of time, and dynamically expanding an amount of information associated with the selected search result based upon the period of time. Further embodiments comprise apparatuses having a display and a selection sensor to sense when a user selects one of the results and measure a period of time that the user selects the result. These embodiments also include a result expander to expand the amount of information displayed for a selected result as the period of time increases.

18 Claims, 7 Drawing Sheets

EXPANSION OF SEARCH RESULT INFORMATION

BACKGROUND OF THE INVENTION

The present disclosure relates generally to searching information of computing devices. More particularly, the present disclosure relates to dynamically expanding the amount of information displayed with search or query results of computing devices.

Corporate networks, intranets, the Internet, and the World Wide Web ("Web") contain vast amounts of information. People spend countless hours searching for documents, either for work, educational research, learning, or for leisurely reading. For example, with the assistance of Internet search engines, computer users can connect to computer systems located around the globe and read information on web pages, look up phone numbers, search through and read digitized books and magazines from libraries, read online news reports, search and read through blogs, and shop for almost anything. Locating contextually relevant information in this sea of information, however, is often challenging.

To locate documents on the Internet, users frequently use an Internet search engine. Internet users typically enter one or more key search or query terms, which may include Boolean operators, into a user interface of a search engine and transmit the search request to a network of servers running the search engine. Search engines generally index information of web pages and other documents of the Web and associate the information with a uniform resource locator (URL) for each page. For example, many search engines index the full body of visible text for a document, but exclude commonly used words, e.g., "the", "and", etc. Search engines may also index keywords included in a special keyword meta tag in the document that holds keywords the page designer designates to use for searching purposes.

When a user performs a search on the Web, the search engine receives the query terms and usually searches indexed information for content items that are associated with the query terms. Search engines attempt to return hyperlinks, such as hyperlinks to the URLs, for web pages that seem to match the content for which the user is searching. Generally, search engines base their search results based on search terms (called a search query) entered by the user. The search engines try to provide links to high quality, relevant results (e.g., web pages or portable document format (PDF) documents) to the user based on the keywords and Boolean operators of the search query. Typically, the search engine accomplishes this by matching the terms in the search query to a corpus of pre-stored web pages, indexed in the manner described previously. Web pages that contain the search terms of the user are identified as search matches or search hits.

Although using Internet search engines to locate information over the Internet is effective, it is often slow and tedious. For example, in response to a search query a search engine may locate hundreds, thousands, or even millions of search results, many of which are often not relevant. As a result, search engine users may be overwhelmed by the enormous amount of search results.

To help reduce the amount of information that a user has to view when examining search results, search, engines often return a fixed amount of data per search execution. For example, each search result match may include numerous pieces of summary information, such as title of the web document of the result match, portions of information from the web document, and a hyperlink for the URL to retrieve or view the document. When passing a mouse pointer or cursor over the title, the user may see the source URL for the web document. The portions of information from the web document may include small segments of text that include one or more of the search terms of the search query, often highlighted or in bold lettering for emphasis.

Unfortunately, the portions of information from the web document often include no more than a few sentence segments. Reviewing the search results with such limited information often forces the user to click on a link to see if the result match is relevant to the information that the user seeks. This often causes an inconvenience to the user, as most browser applications abruptly change the information on the display screen when the user clicks a link-embedded portion for a search result. This abrupt change of information on the display often makes it difficult for the user to keep track of the initial search pages, linked pages viewed from the initial search page, and precisely where the user is relevant to viewing a series of several pages.

Some search engines allow a user to customize the number of lines returned. However the number of lines selectable by the user is static for all search results. For example, the user may increase the number of lines of summary information from three lines to ten lines. However, this generally increases bandwidth but still frequently does not provide sufficient information to allow the user to determine whether the results are relevant. Additionally, this known solution does not allow the user to expand just a single page or result match in which the user is interested. Again, the user is forced to visit and retrieve the web page to determine the actual relevancy of the content.

BRIEF SUMMARY OF THE INVENTION

The following is a detailed description of embodiments depicted in the accompanying drawings. The discussion is in such detail as to clearly communicate the illustrated embodiments. However, the amount of detail offered is not intended to limit the anticipated variations of embodiments; but on the contrary, the intention is to cover all modifications, equivalents, and alternative embodiments consistent with the appended claims. The detailed descriptions below are designed to make such embodiments obvious to a person of ordinary skill in the art.

Generally speaking, methods, apparatuses, and computer program products to dynamically expand the amount of information displayed with search or query results are contemplated. Some embodiments generally comprise a method for viewing information of a search. These embodiments may include presenting a number of search results in response to the search, enabling a user to select one or more of the search results for a period of time, determining an amount of information to display based on the period of time, and dynamically expanding the amount of information displayed associated with the selected search results.

Some embodiments may also include retrieving additional information associated with a selected search result to enable the expansion. In various embodiments, presenting the plurality of search results may comprise returning search hits for search terms provided to an Internet search engine. In other embodiments, presenting the plurality of search results may comprise returning database matches for query terms of a database query. For numerous embodiments, enabling the user to select the search result may comprise allowing the user to navigate a mouse pointer over the search result. In some of the embodiments, expanding the amount of information may comprise increasing an amount of text information displayed to the user, the text information being associated with search terms of the search.

Further embodiments comprise apparatuses having a display generator, a selection sensor to sense when a user selects one of the results, wherein the selection sensor is arranged to measure a period of time that the user selects the one of the results. These embodiments also include a result expander to expand an amount of information displayed for the one of the results, wherein the amount of information displayed increases as the period of time increases.

Many embodiments may have a query buffer to store information for the expansion. Numerous embodiments have a mouse, a stylus, and/or a touch-sensitive screen that operates in conjunction with the selection sensor. Further embodiments also have a processor, a keyboard, and a network communications device, and at least one of a hard disk and a flash memory device. For example, these embodiments may comprise a laptop computer, a desktop computer, or a portable computing device, to name just a few.

In some embodiments, the selection sensor will comprise an input device arranged to work in conjunction with a pointer of the display generator. In many embodiments, the result expander may comprise a processor executing, operational code for the device, with the operational code having routines to receive images and display the images around the one of the results. In some embodiments, the result expander may increase the amount of information displayed at an increasing rate as the period of time increases.

Even further embodiments comprise a computer program product comprising a computer useable medium having a computer readable program, wherein the computer readable program causes the computer to list search results generated by a search engine, detect when a user selects one of the search results, measure a duration of time that the user selects the search result, and increase an amount of text displayed for the search result based upon the measured duration.

A few embodiments may also cause the computer to generate text-to-speech sounds for the increased amount of text. Many embodiments will also cause the computer to detect when at least two different search terms displayed for one of the search results are selected, wherein text of the increased amount of text displayed differs based upon the search term selected. Some embodiments may also cause the computer to generate a pop-up window to display the increased amount of text and collapse the window when the user deselects the search result.

In some embodiments, detecting when the user selects the search result comprises detecting when the user either clicks on text of the search result or when the user moves a pointer over the search result. In many embodiments, the computer readable program causes the computer to perform operations for browsing web pages of the Internet.

BRIEF DESCRIPTION OF THE SEVERAL VIEWS OF THE DRAWING

Aspects of the various embodiments will become apparent upon reading the following detailed description and upon reference to the accompanying drawings in which like references may indicate similar elements.

DETAILED DESCRIPTION OF INVENTION

Figure 1:
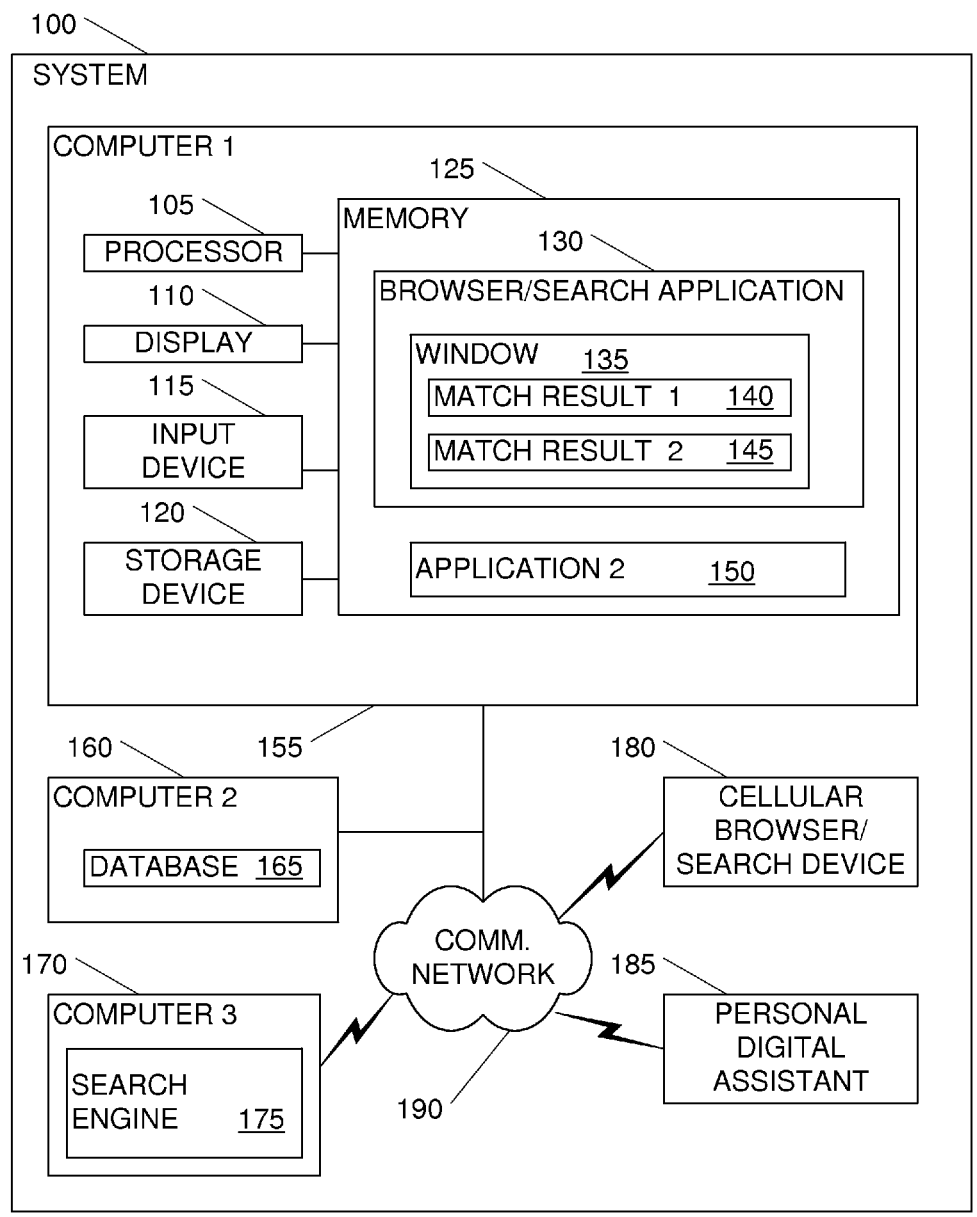
FIG. 1 depicts an embodiment of a system that may dynamically expand the amount of information displayed with search or query results, comprising a processor, memory, and a browser or search application.

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

In many of the following paragraphs, numerous embodiments are discussed using the terms "query" and "search". One may interpret the term "query" to mean "interrogate a collection of data or information" such as records in a database. However, one may also interpret the term to mean "search a single file or collection of files", such as hypertext markup language (HTML) files or documents on the Web. Query may also mean the list(s) of records of the interrogation that match the search criteria. A query on the Web generally may produce a list of matching pages and frequently called a "search." Consequently, the two terms may often be interchanged or substituted for one another.

A "document," as the term is used herein, may be broadly interpreted and include any machine-readable and machine-storable work product. A document may include a file, a combination of files, a web page (such as an HTML file), a portable document format (PDF) file, an e-mail, a text file, a rich text format (RTF) file, a postscript (PS) file, one or more files with embedded links to other files, a forum page of text and graphics, a posting to a forum, a blog, an electronic version of printed text, and a digital picture (JPEG, GIF, BMP), only to name a few. As those skilled in the art will recognize there are hundreds of different types of files, each of which may be considered a document as the term is used herein. In the context of the Internet, common documents are web pages. Documents often include textual information and may include embedded information (such as meta information, images, hyperlinks, etc.) and/or embedded instructions (such as Javascript, ActiveX, etc.). A "hyperlink" or simply a "link," as the term is used herein, is to be broadly interpreted to include any reference to/from a document from/to another document, or another part of the same document.

Even further, some of the discussions use the terms "server" and "client". Generally, the term "server" may refer to a computer of device on a network that manages network resources. Clients may generally be thought of as computer applications running on computer systems that access the services provided by server applications and dedicated server computers. However, in several instances in the discussion these terms are interchangeable. Accordingly, one should not conclude that a discussion that uses only "client" of "server" terms, as opposed to using "computer" or "computer systems" terms, is meant to limit the discussion to one term of the other. One of ordinary skill in the art will recognize that such variations may be substituted for the described methods and systems, and employed in accordance with similar constraints, to perform substantially equivalent functions.

Also in many of the following paragraphs, numerous embodiments are illustrated by expanding text associated with query or search results. While many search engines produce text of web pages, some search engines also search images on the Internet and provide search results for images in addition to, or in lieu of, text search results. Such image search engines may use the HTML structure and text in relative close proximity to an image, such as a caption for an image. Alternative embodiments may therefore expand image information of search results. In other words, both types of information may be expanded for search/query results in alternative embodiments. Additionally, some embodiments may expand or produce graphical information for a selected search result, such as generating a graph for the expansion.

While some of the specific embodiments described below will reference the embodiments with specific configurations, those of skill in the art will realize that embodiments of the present disclosure may advantageously be implemented with other configurations with similar issues or problems.

Turning to the drawings, FIG. 1 illustrates a system 100 which may comprise several different computing devices which may be involved with generating search results for a browser or search application 130. For example, system 100 may allow a person to enter query or search terms into a search engine on the Internet and produce a list or results. System 100 may comprise a network having many interconnected computing devices. For example computer 155 may comprise a desktop or laptop computer connected to a number of other computing devices, such as computers 160 and 170, cellular browser or search device 180, and personal digital assistant (PDA) 185. The types of devices that may receive and expand a list of search results may vary from one embodiment to the next. For example, cellular search device 180 may comprise a cellular telephone having an integrated web browser application in one embodiment. PDA 185 may comprise one or more of a variety of different devices, such as a Palm® organizer or a Windows Mobile® PDA device as a couple of examples, having wireless communication capabilities.

The other computers of a system may also comprise different types of computing devices. For example, one or more computers may comprise a desktop or a laptop computer. Alternatively, in different embodiments, the computers of a system may comprise a mixture of server and client computing devices. For example, computer 160 may comprise a server running a database server application 165 that users of client computers, such as computer 155, cellular browser 180, and PDA 185 may access.

The computing devices of a system, such as system 100, may connect to one or more other computing devices of the system using a variety of different hardware in various embodiments. For example, computer 155 may comprise a desktop computer connected to computer 160 via an Ethernet cable coupled to a local or wide area network (LAN or WAN). Cellular browser 180 may comprise a combination cellular telephone/PDA device coupled to computer 160 over the Internet, which may be represented by communication network 190, via a wireless virtual private network (VPN) link and located across town or in another country. In other words, various embodiments of a system like system 100 may comprise an almost limitless number of wired and/or wireless communication devices, allowing computers and portable devices of the system to communicate with each other, wherein the computers may be located close to or remote from each other.

The computers and other devices of a system may each execute a variety of different applications and communicate with each other in a variety of different ways, in different embodiments. In addition to search application 130, computer 155 may run a second application 150, which may be an e-mail application or a text-to-speech application. For example, application 150 may comprise a simple mail transfer protocol (SMTP) and/or post office protocol (POP) e-mail client application. Application 150 may run independently of application 130 or work in conjunction with application 130 when a user is expanding information associated with search results. For example, search application 130 may work in conjunction with a text-to-speech application. Wherein the text-to-speech application reads the lists of search results to a hearing impaired user of computer 155.

Computer 170 may comprise a server running a search engine application 175, generating search results for users which request searches, such as users of computer 155, cellular search device 180, or PDA 185. For example, a person using computer 155 may generate a search request via a graphical user interface (GUI) form generated by computer 170. Computer 170 may receive the search request, perform a search operation via search engine 175, and provide a list of search results to computer 155. In alternative embodiments, search engine 175 may comprise different applications that generate search results in different ways. For example, application 175 may comprise a web page server, a forum or blog server, a file transfer protocol (FTP) server, a gopher server, or a telnet server, as examples. In other words, applications of computer 170 may receive varying types of search requests and generate differing types of search results for the other computers of system 100 in alternative embodiments.

In one or more embodiments, a computer such as computer 155 may have a processor, such as processor 105, for executing program instructions of the various applications that may be in memory 125, such as search application 130. Search application 130 may vary from embodiment to embodiment. For example, in one embodiment, search application 130 may comprise an Internet browser application, such as Mozilla® Seamonkey®, Mozilla® Firefox®, Opera™, or Safari™, to list just a few. In an alternative embodiment, search application 130 may comprise a database query application, such as Microsoft® Access™, accessing and searching database 165 of computer 160 for database matches. Browser and database applications are just two examples, with other types of search applications being possible in alternative embodiments.

A system may display data of search results on a monitor or other computer display, such as display 110. Using input device 115, the user of computer 155 may enter various search terms, which may include Boolean operators or logical text operators, when requesting a search. For example, input device 115 may comprise a keyboard and/or a mouse. In some embodiments input device 115 may comprise a tablet and stylus, such as a pressure-sensitive or capacitance-sensitive surface of a PDA that recognizes hand-written characters. In even further embodiments input device 115 may comprise an audible input device, such as a microphone used for speech recognition.

A user of computer 155 may connect to the Internet via search application 130 and initiate a search session with search engine application 175 of computer 17. Upon entering several search terms into a GUI search request screen, the user may send the search request to computer 170. Computer 170 may receive the search request, perform a search using the search terms via search engine application 175, and send the results of the search back to computer 155 and search application 130. Search application 130 may present the search results, or match results, of the search via a window 135. For example, search application 130 may list numerous match results in window 135 such as match result 140 and match result 145. Match results 140 and 145 may contain short excerpts for documents matching one or more of the search terms.

Once the user of computer 155 receives the list of match results in window 135, the user may manipulate input device 115 to select one or more of the match results (140, 145). Once the user selects one of the match results, search application 130 may detect this selection and dynamically expand the amount of information associated with the match result selected by the user. For example, the user may place a mouse pointer over the short excerpt for match result 145 for a period of three seconds. After measuring the duration or passage of this period of time, search application 130 may supplement or add additional text to the short excerpt initially provided for match result 145. If the user continues to hold the mouse pointer over match result 145, search application 130 may continue adding more text to match result 145. Dynamically expanding the amount of information available to the user in this manner may allow the user to determine whether match result 145 is coritextually relevant to the information that the user seeks, without forcing the user to actually load the entire page and increase the overall bandwidth of system 100.

This process of expanding, the amount of information for a match result may be repeated for other match results. For example, the user may move the mouse pointer from match result 145 to deselect match result 145, whereupon search application 130 may collapse the expanded amount of information. Once the user selects another match result, such as match result 140, search application 130 may dynamically expand the amount of information associated with match result 140. During the next period of time that the user selects match result 140, search application 130 may supplement or add additional text to the short excerpt initially provided for match result 140.

Depending on the embodiment, the applications that generate the search requests and the applications that generate the search results, may communicate with each other using a variety of communication protocols. For example in many embodiments, applications 130 and 175 may use a Hyper Text Transfer Protocol (HTTP). In alternative embodiments, applications 130 and 175 may use a file transfer protocol (FTP), or other protocol. Additionally, depending on the embodiment, the computers of a system may run various types of operating systems. For example, computers 155, 160, and 170 may run Unix®, Microsoft® Windows®, OS/2®, Linux®, DOS, or Mac OS® X. Each computer may run the same operating system as the others or a different one.

An operating system, applications 130 and 150, and results of queries and searches produced with search application 130 may be stored in a storage device 120. For example, storage device 120 may comprise a mass storage device such as a parallel or serial communication bus hard disk drive. Storage device 120 may also comprise an optical storage device, such as a rewritable compact disc (CD) or a digital versatile disc (DVD) drive. In other embodiments, storage device 120 may comprise a flash memory device, such as a universal serial bus (USB) thumb drive.

While the preceding example discussed a system 100 employing local memory 125 and a local storage device 120, alternative embodiments may comprise a system executing or accessing programs and documents in remote locations. For example, search application 130 may actually comprise two programs, one on a local client system and another on a remote server system. The local client program may be a web browser running a Java application for a web page of a database server application, such as database 165. The database server application (element 165) web page may have been downloaded from computer 160. The user of computer 155 may use input device 115 and application 130 to enter various parameters or query terms, and request a query or search for information in a database of the database server application (element 165). As a person skilled in the art will quickly appreciate, system 100 may comprise numerous communication and networking configurations, with almost unlimited combinations of local and remote search and/or query applications.

Similarly, the types of memory devices comprising memory 125 may vary in different embodiments. In numerous embodiments, memory 125 may comprise volatile memory elements, such as two 1-gigabyte (GB) dynamic random access memory (DRAM) sticks. In alternative embodiments, memory 125 may comprise nonvolatile memory. For example in an alternative embodiment memory 125 may comprise a flash memory module, such as a 4 gigabyte (GB) flash memory card.

Figure 2A:
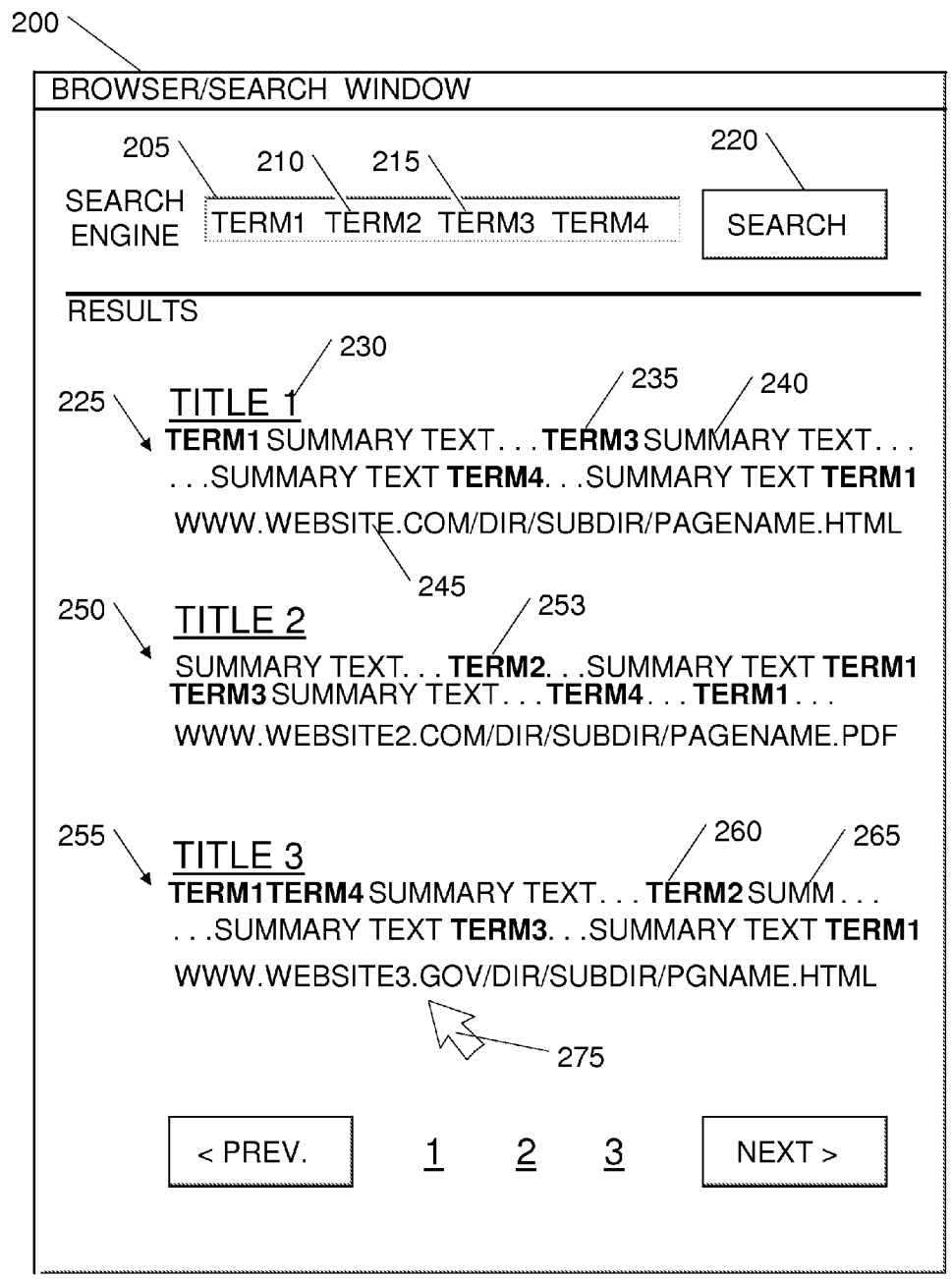
FIG. 2A provides an example list of search results that a user may see in response to entering search terms and performing a search.

To provide a more detailed illustration of how results of a search may be dynamically expanded, we turn now to FIG. 2A. FIG. 2A provides an example list of search results that a user may see in response to entering search terms and performing a search, such as one of the queries or searches described in the discussion for FIG. 1.

FIG. 2A depicts a browser window or search window 200. For example search window 200 may correspond to window 135 shown in FIG. 1 for a browser application. The information presented in search window 200 may represent screen results presented to a user that has performed a search using ah Internet search engine. For example, using text input box 205 the user may have entered numerous search terms, such as search term 210 in search term 215, and clicked on the search button 220 to have the search engine performance its search. The bottom portion of search window 200 shows what may be numerous search results returned from the search engine for the specified search terms. The results section shows that the search engine may have returned three search hits or search results, namely search result 225, search result 250, and search result 255.

Each of the search results may have numerous components are parts. For example, search result 225 has a title 230, numerous search terms such as search term 235 highlighted among various pieces of information such as summary text 240, and a URL 245 corresponding to the source document containing the information identified as relevant for the search terms. It should be noted however that search results 225, 250, and 255 are merely examples. Different embodiments will produce different search results, such as fewer or more lines of summary text, more or fewer search results displayed per page or per window pane, document type information, and document size, etc., for each of the search results.

Assume for the sake of illustration that the user is particularly interested in search results pertaining to how search term 210 may be used. For example, the user may want to find out more information pertaining to search term 210 in a particular context. After performing the search in obtaining search results 225, 250, and 255, the user may observe that search results 250 and 255 both contain search term 210 (elements 253 and 260). However, based on the limited amount of information presented the user may be unable to determine the particular context for the search term (260). For example, summary text 265, which is associated with the search term, is only partially displayed. Accordingly, the user may desire additional information regarding search result 255. To obtain the additional information, the user may select search result 255 using, for example, a pointing device, such as a mouse.

Mouse pointer 275 may comprise one of many types of pointers or cursors that may be controlled by an input device such as a mouse, a trackball, a keyboard joystick, a stylus, a touch screen, or any user manageable device. The user may manipulate or move mouse pointer 275 over each of the individual search results (225, 250, and 255). A user may navigate around the search results of search window 200 by moving the input device or by pressing keys on a keyboard. The user may expand preview information by navigating or passing mouse pointer 275 over a defined area, such as over a visible or invisible rectangle having its sides immediately adjacent to the edges of the text of search result 255. Moving the mouse pointer in this manner may cause the application generating search window 200 to interpret the actions of the user as intending to select search result 255. In some embodiments, merely moving the pointer or cursor over/near a search result will suffice as selecting the search result. However, alternative embodiments may require the user to actually click the search result in order to select the search result for expansion, such as by clicking and holding. In further embodiments, the user may indicate a desire to see more information of the search result by placing the tip of a stylus over the search result for an extended period of time. In even further embodiments, the user me expand the information displayed by pressing a certain key-combination on a mouse or keyboard, such as by simultaneously pressing the left and right mouse buttons simultaneously.

Once the user selects the search result to be dynamically expanded with mouse pointer 275, the application controlling the content, displayed in search window 200 may begin monitoring the duration that, the user selects the search result. For example, if the user merely passes over a search result in moving from one search result to another, the application may recognize this and not begin expanding any search result, information. However, if the user selects the search result for a sufficient period of time, the application may determine an amount of information to display based on the period of time and start dynamically expanding the amount of information displayed for the search result. To see an example of how an embodiment may dynamically expand the information displayed for a search result, we move to FIG. 2B.

Figure 2B:
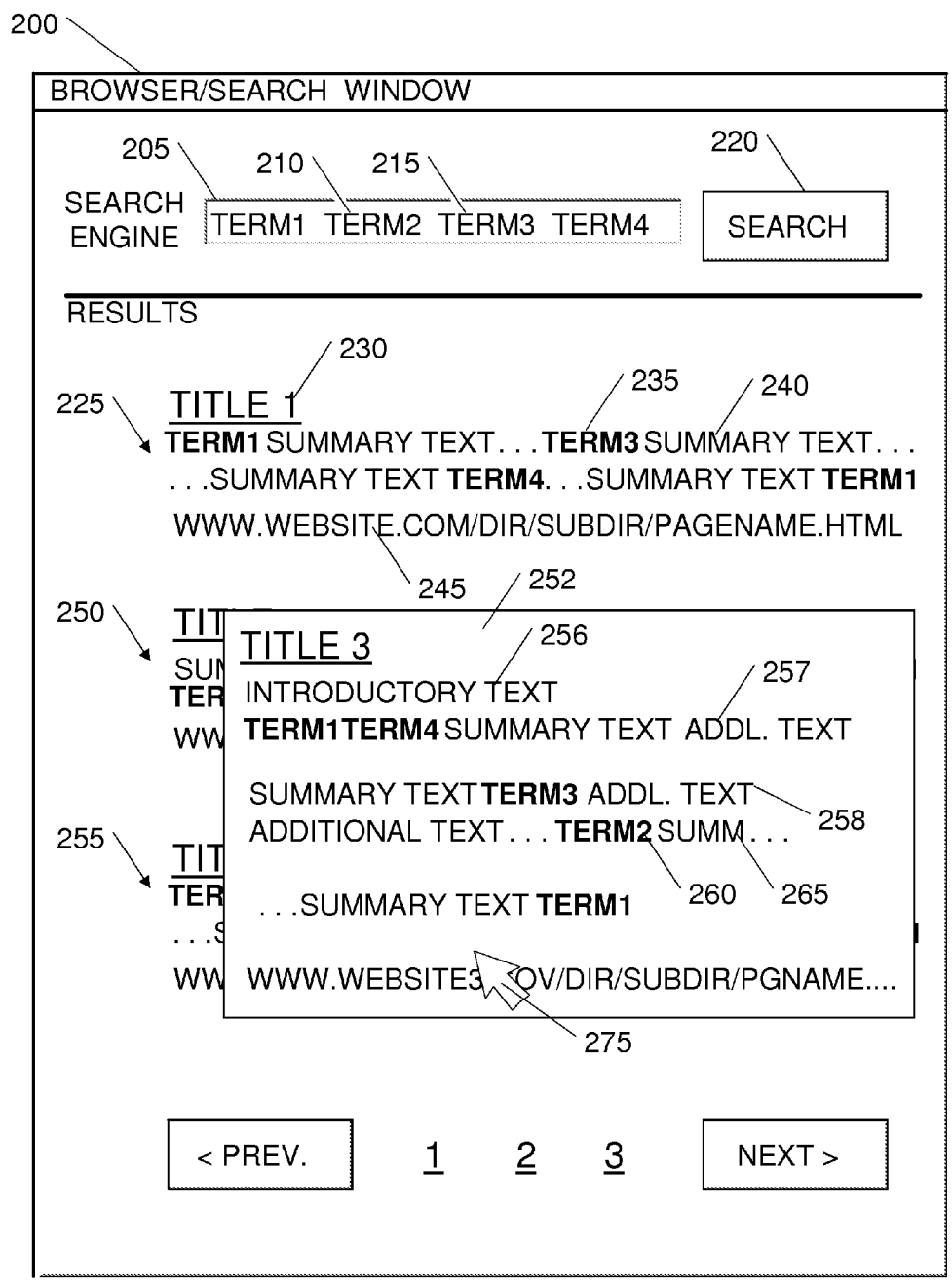
FIG. 2B illustrates how the user may select one of the search results and have a window pop up to display dynamically generated text associated with the selected search result.

FIG. 2B illustrates how the user may select one of the search results and have a window pop up to display dynamically generated text associated with the selected search result. For example the user may have manipulated the mouse so as to move mouse pointer 275 over search result 255. After hovering mouse pointer 275 over search result 255 for a sufficient amount of time, such as two seconds, the application controlling the content displayed in search window 200 may generate pop-up window 252, determine an amount of information to display based on the amount of the time, retrieve additional the amount of information associated with search result 255, and start dynamically expanding the amount of information displayed for search result 255. As FIG. 2B illustrates, the application may populate pop-up window 252 with more information than the amount that was originally shown for search result 255. For example, pop-up window 252 now includes more context information, such as introductory text 256, additional text 257, and additional text 258.

Even though the application may have presented more information to the user pertaining to search result 255, the user may still be faced with insufficient information to see the specific context information associated with the desired search term (260). For example, summary text 265 may still be abbreviated or otherwise incomplete. In order to retrieve additional context information and cause it to be displayed, the user may continue selecting, search result 255 and thereby increase the period of time that search result 255 is selected. The application controlling the content displayed in search window 200 may recognize this additional selection time and continue dynamically expanding the amount of information displayed for search result 255.

Figure 2C:
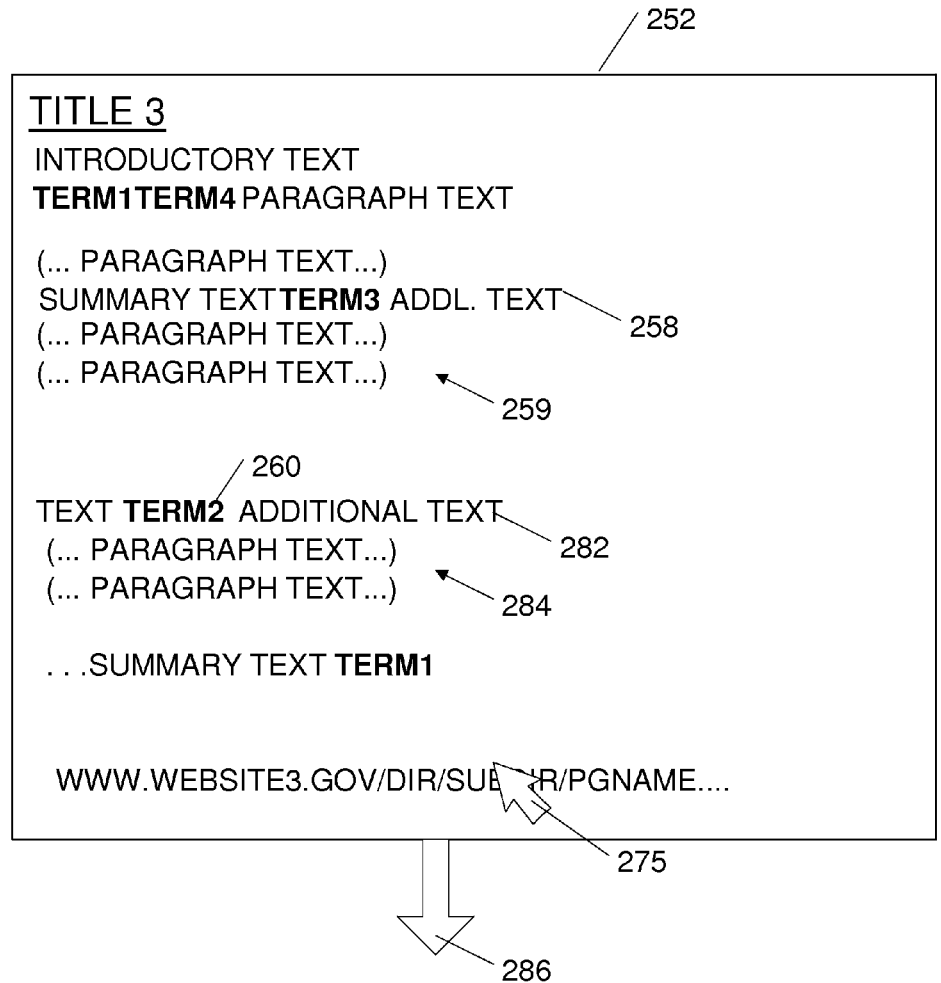
FIG. 2C illustrates in more detail how the user may continue selecting a search result to have the amount of text displayed increase as the period of time increases.

FIG. 2C illustrates in more detail how the user may continue selecting a search result to have the amount of text displayed increase as the period of time increases. For example, the application controlling the content displayed in pop-up window 252 may continue increasing the size of pop-up window 252 (element 286) and displaying additional text information, such as the additional paragraph text 259. As FIG. 2C illustrates, the application may populate pop-up window 252 with more information than the amount that was included in the first expansion of FIG. 2B. For example, pop-up window 252 now includes more context information for the search term (element 260) in which the user is most interested. Pop-up window 252 now includes additional text 282 and additional paragraph text 284. Such additional context information being presented to the user in this dynamic fashion may allow the user to determine whether to actually click on the search result in order to visit the web site or load the entire document and examine the page or document in more detail.

The manner in which the application controlling the content displayed in pop-up window 252 expands and adds information into pop-up window 252 may vary from embodiment to embodiment. For example, in at least one alternative embodiment a user may be able to select among different highlighted search terms provided in the search results. For example with reference to FIG. 2C, the user may have placed mouse pointer 275 over one of the search terms (260), to which the application may have first retrieved and displayed additional text 282 and paragraph text 284. Alternatively, the user may have placed, mouse pointer 275 over a different search term which may have instead caused the application to first retrieve and display additional text 258 and paragraph text 259.

Figure 3:
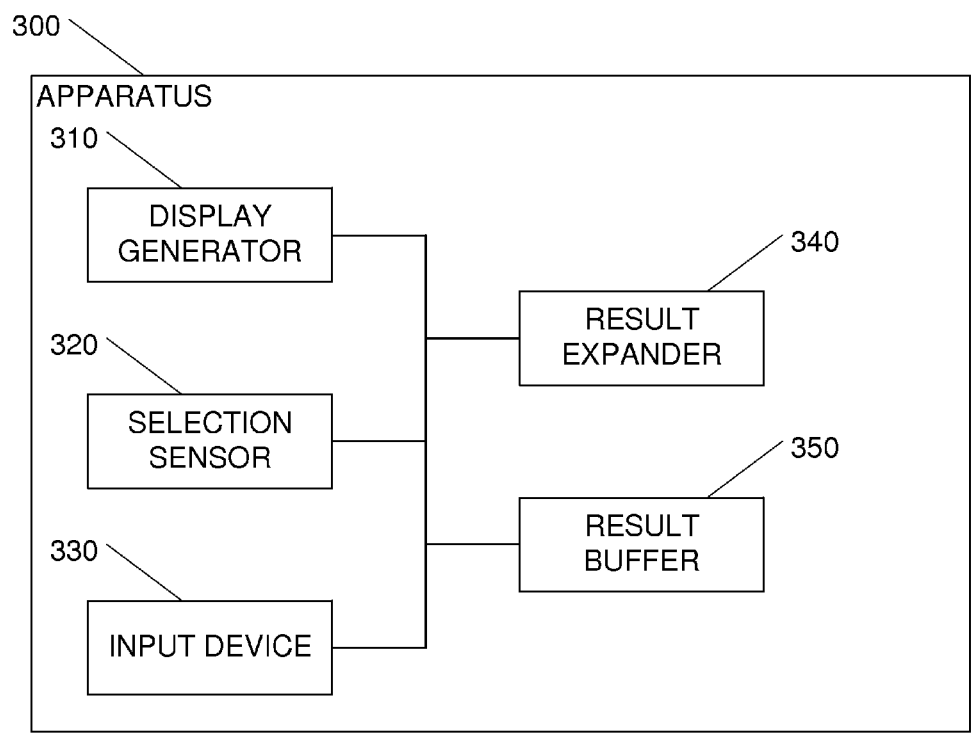
FIG. 3 depicts an embodiment of an apparatus having numerous modules for dynamically expanding the amount of information displayed with search or query results.

FIG. 3 depicts an embodiment of an apparatus 300 having numerous modules for dynamically expanding the amount of information displayed with search or query results, namely a display generator 310, a selection sensor 320, an input device 330, a result expander 340, and a result buffer 350. The form of apparatus 300 will vary from embodiment to embodiment, with one or more elements in the form of hardware, software, or a combination of both hardware and software. For example, in one embodiment apparatus 300 may comprise a combination of both hardware and software elements, such as those that might be found in a desktop computer or portable computing device. In an alternative embodiment, apparatus 300 may comprise only software elements for performing functions by a device, such as firmware code stored within nonvolatile memory of the device. Additionally, in at least one alternative embodiment, the elements of apparatus 300 may reside in more than one device. For example, some elements of apparatus 300 may reside on one computing platform, such as a server, while one or more other elements reside on another computing platform or computing device, such as a server.

Apparatus 300 may comprise a display generator 310 to produce a plurality of search results for viewing by a user. For example, display generator 310 may comprise a set of software routines that receives search results from an Internet search engine and lists them on an LCD screen. Once the search results are displayed by display generator 310, selection sensor 320 may monitor input device 330 and sense or detect when the user selects one of the search results. For example, selection sensor 320 may comprise a combination of software and hardware that interfaces with a touch screen of a PDA and senses when the user touches a stylus to the touch screen where a selection result is displayed. In other words, selection sensor 320 may be able to determine which search result the user is selecting based on where the user places the stylus on the touch screen. Once selection sensor 320 senses that the user has selected one of the search results, selection sensor 320 may also sense how long the user continues to select the search result. For example, selection sensor 320 may be able to determine when the user moves a mouse pointer over the search result, depresses the right mouse button, and holds the right mouse button depressed for fifteen seconds.

Once selection sensor 320 works with input device 330 to determine which search result the user selects and how long the user selects the search result, result expander 340 may work in conjunction with display generator 310 and start expanding the amount of information displayed for the selected search result. For example, result expander 340 may retrieve several lines of text processed by a search engine stored in a cache, which may eliminate the need for further interaction with a server. Result expander 340 may be configured to display an additional ten words for every two seconds that the user continues selecting the search result. If the selected search result initially has twenty Words displayed, result expander 340 will provide ten additional words every two seconds to display generator 310 so that display generator 310 increases the number of displayed words from twenty to thirty after two seconds, from thirty to forty after four seconds, from forty to fifty after six seconds, etc.

The rate at which result expander 340 expands the amount of information displayed for a selected search, result may vary in different embodiments. In the example just described, result expander 340 displayed an additional 10 words every two seconds, in a linear manner. That is to say, result expander 340 displayed a fixed number of additional words for each quantity of time that the selected search result was selected. For such embodiments the number of words displayed per unit of time may vary from embodiment to embodiment, such as five, ten, or twenty. Also for such embodiments units of time which elapse before additional words are displayed may also vary from embodiment to embodiment, such as one second, two seconds, five seconds, etc. Additionally, in even further embodiments, the number of words per unit of time and/or the unit of time itself may vary. For example, in one embodiment selection sensor 320 may sense that a particular search result is selected for a period of five seconds before displaying any additional words but then display an additional ten words, wait two seconds and display twenty more words, wait two more seconds and display forty more words, wait only one more second and display 100 additional words. In other words, result expander 340 may increase the amount of information displayed at an increasing rate as the amount of this selection time increases. As one skilled in the art will recognize, either the number of words or the unit of time for the selection may change in a linear or nonlinear manner from embodiment to embodiment or even within the same embodiment.

Result expander 340 may work in conjunction with result buffer 350 when expanding the amount of information displayed for a search result. For example, once selection sensor 320 senses that a user has manipulated input device 330 to select a particular search result expander 340 may immediately retrieve additional information associated with the search result, such as retrieving additional words from the source document or source webpage, and store them in result buffer 350. Once the user has continued to select the search result for a sufficient period of time, result expander 340 may pull a portion of the words offered in result buffer 350, such as ten words out of one hundred stored, and send them to display generator 310 for the expansion of the display. As time continues to pass, result expander 340 may continually pull more words or information from result buffer 350 and send them to display generator 310 for displaying to the user.

Apparatus 300 may vary in different embodiments. Some embodiments may have fewer modules than those module depicted in FIG. 3. For example, one embodiment may not have result buffer 350. In such embodiments, result expander 340 may continue to retrieve additional words from the source document for each subsequent unit of selection time. In other embodiments, apparatus 300 may include additional modules, such as storage devices, database modules, search engines, and communication cards. Additionally, some embodiments may have different combinations of elements perform different functions. For example, in some embodiments a single module may perform the functions of both selection sensor 320 and input device 330.

Figure 4:
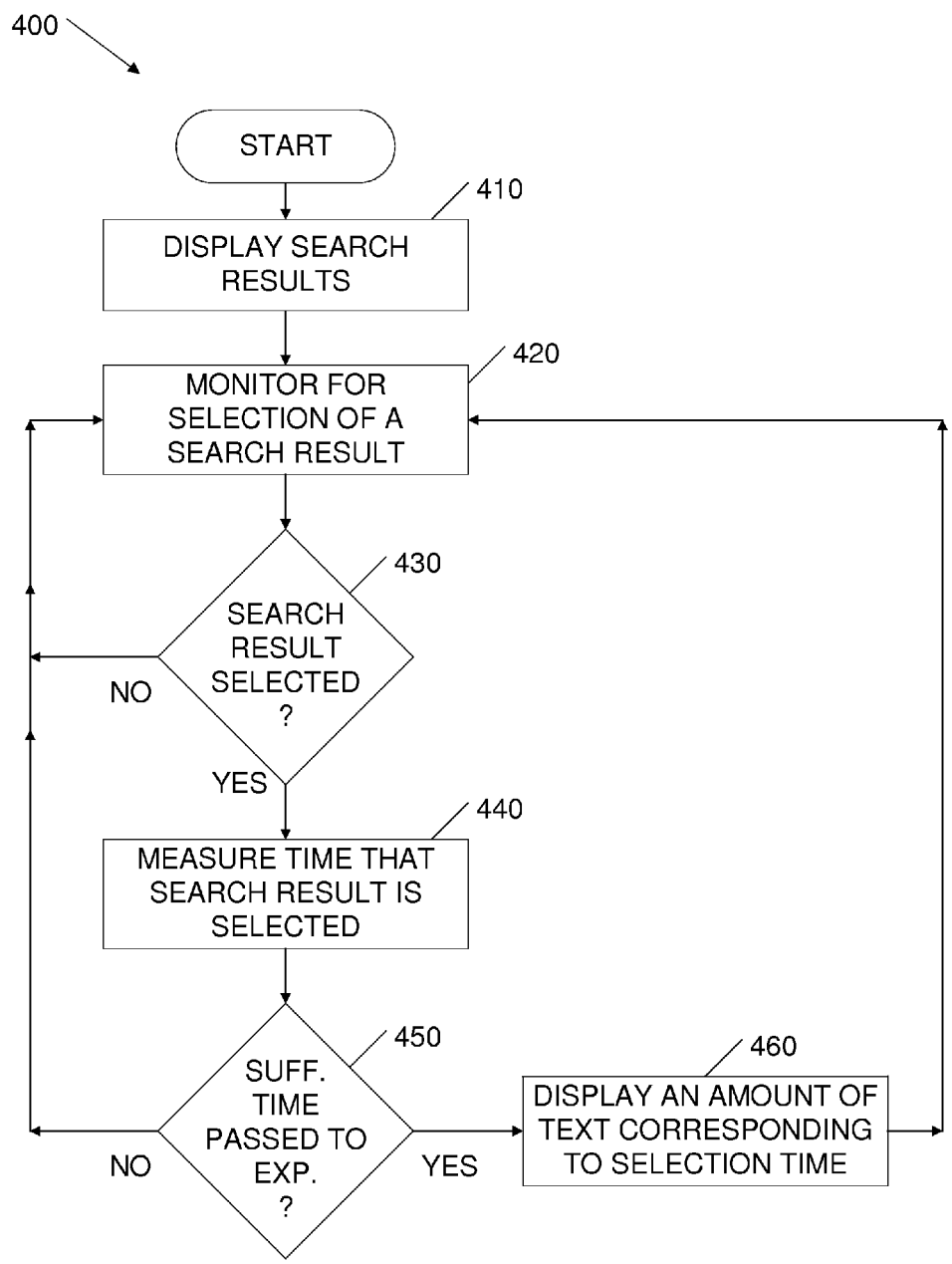
FIG. 4 illustrates a flow chart of an algorithm for dynamically expanding the amount of information displayed with search results.

FIG. 4 illustrates a flowchart 400 of an algorithm for dynamically expanding the amount of information displayed with search or query results. For example, at least one embodiment of system 100 shown in FIG. 1 may employ the algorithm for computer 155 when expanding the amount of information displayed with match result 140. Flowchart 400 begins with displaying search results (element 410). For example, a college student may be in an Internet café surfing the web with a cellular telephone that has advanced capabilities for web browsing (element 180). Using cellular search device 180, the college student may perform a search using one of various Internet search engines. For example, the college, student may want to learn more information about two candidates that are running in a current election. The college student may enter the names of the candidates into the displayed search box for the Yahoo!® Internet search engine.

Upon entering and sending the names of the candidates, the search engine may display a number of search hits, such as six or seven hits, on the screen of the cellular search device 180. Once cellular search device 180 displays the search results (element 410), cellular search device 180 may monitor the actions of the college student to determine whether the student selects one of the search results (element 420). For example, cellular search device 180 may have four directional arrow buttons located in a circular fashion around a center selection button. The browsing application of cellular search device 180 may allow a college student to highlight the individual search results using the up and down arrow buttons. Once a search result is highlighted, the college student could go directly to the source document of the highlighted search result by pressing the center selection button. Instead, however, the college student may cause the cellular search device 180 to display a preview of the document by pressing and holding the right arrow key once the search result is highlighted. By pressing the right arrow key in this manner once the search results is highlighted, cellular search device 180 may sense that the college student has selected the search result and would like additional information (element 430).

An embodiment employing the algorithm of flowchart 400 may measure how long a user selects the search result (element 440). For example, cellular search device 180 may sense that the college student has selected a particular search result and held down the right arrow key for more than 0.75 seconds. If an insufficient amount of time has passed, the embodiment may go back and continue to monitor for selection of one of the search results (element 420). However, once the user selects a search result for a sufficient amount of time for an expansion of displayed information (element 450), an embodiment employing the algorithm of flowchart 400 may display more information for the search result. For example, once the college student has held down the right arrow key for more than 0.75 seconds, cellular search device 180 may expand the display to include an additional line of text (element 460) for the highlighted search result. Cellular search device 180 may then monitor for continued selection of the search result (element 420). For example, cellular search device may sense that the college student continues to hold down the right arrow button for one more second (elements 430 and 440). Based on this additional selection time, cellular search device 180 may expand the display to include two more additional lines of text and one additional image for the highlighted search result (elements 450 and 460).

Once a user deselects a search result, an embodiment according to the algorithm of flowchart 400 may sense such de-selection. For example, cellular search device 180 may leave the display in, its currently expanded form with the additional information or it may collapse the additional information and return the display back to its original or unexpanded form. The embodiments may then continue monitoring for selection of any of the search results displayed on the screen, so that their search results may be expanded in a similar fashion. For example, cellular search device 180 may monitor for activation of the right arrow key once any of the other search results are highlighted or selected. This process of monitoring and expanding search results may continue for the current page of search results as well as for subsequent pages of search results which may be retrieved.

Figure 5:
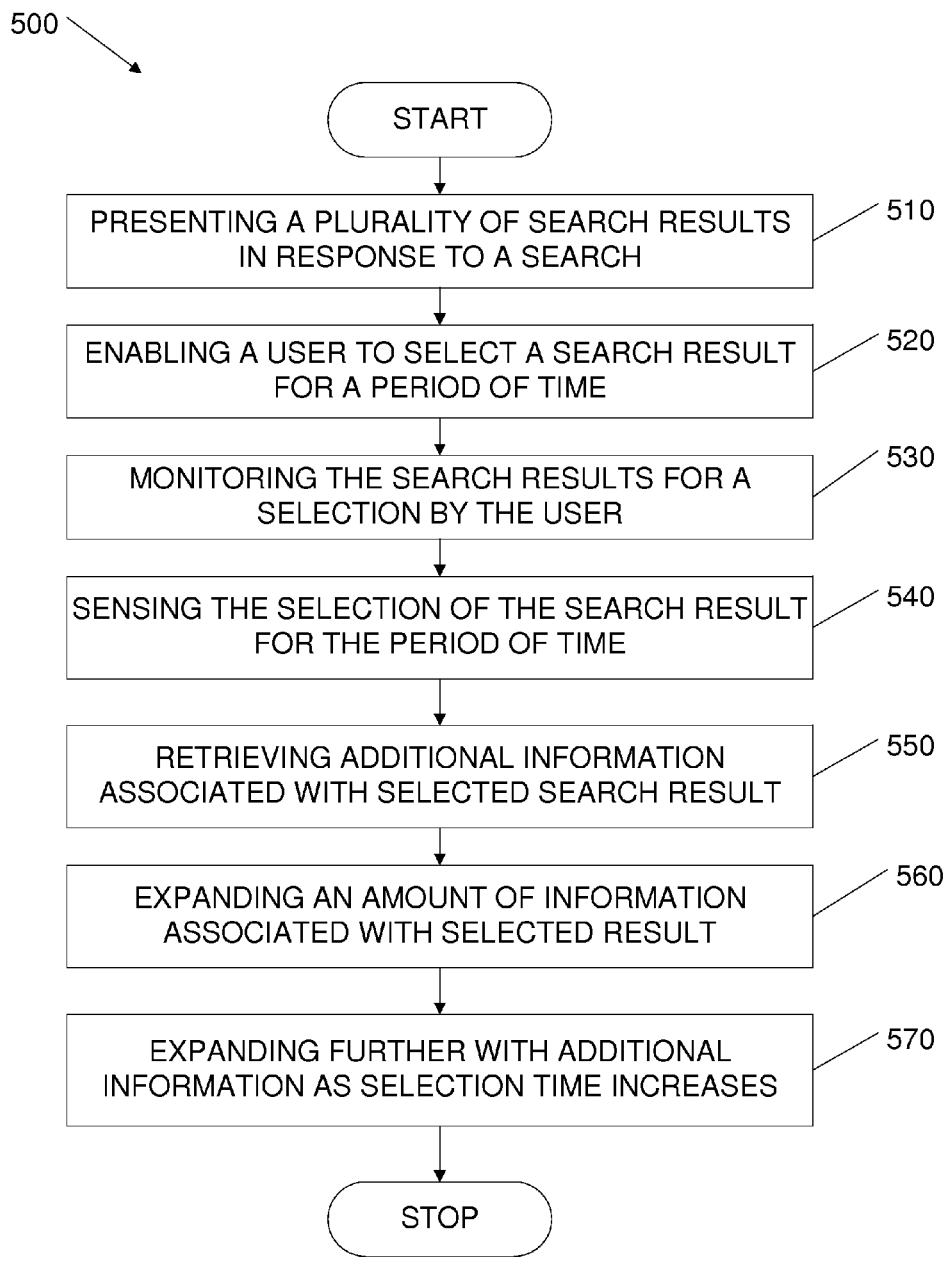
FIG. 5 illustrates a flow chart of a method for expanding information displayed for selected search results.

FIG. 5 illustrates a flowchart 500 of a method for expanding information displayed for selected search results. For example, computer 155 depicted in FIG. 1 may employ the method of flowchart 500 when performing a database search using search application 130 and retrieving search results from database 165 in computer 160. A method according to flowchart 500 may begin with presenting a plurality of search results in response to a search (element 510). For example, the user of computer 155 may be a stock analyst. The analyst may want to analyze the performance of stocks for a number of companies during the previous year. Database 165 may contain historical stock information for various stocks, such as the names of individual stocks and the values-per-share for each day of closing of the stock market. Using a database query, the user may perform a search for all stocks that had increases in valuations of 30% or more during the previous year. Search application 130 may take the search parameters or search terms of the analyst, generate a set of query terms, and send the set of query terms to computer 160. Computer 160 may analyze the stock data stored in database 165 and generate a number of search results based on the query terms. Computer 160 may send the search results back to search application 130, whereupon search application 130 may display the search results to the analyst via display 110 (element 510). For example, window 135 may contain the names of two stocks, such as match result 140 and match result 145.

An embodiment of flowchart 500 continues by enabling a user to select a search result for a period of time (element 520) and monitoring the search result for selection by the user (element 530). For example, the analyst may move a mouse pointer over one of the stock names (match result 140) using a trackball, whereupon search application 130 may sense that the mouse pointer is over match result 140 and change the background color from white to light cyan. An embodiment of flowchart 500 continues by sensing the selection of the search result for the period of time (element 540). For example, search application 130 may sense how long the analyst has placed the mouse pointer over match result 140, which may be three or more seconds.

An embodiment of flowchart 500 continues by retrieving additional information associated with the selected search result (element 550). For example, search application 130 may request additional historical stock information from database 165 for the stock associated with match result 140. An embodiment of flowchart 500 may then continue by expanding an amount of information associated with the selected result (element 560). For example, once search application 130 retrieves the requested additional stock information for match 140, search application 130 may create a pop-up window which displays a graphical trend of values of the stock for the month of December in the previous year.

An embodiment of flowchart 500 continues by expanding the amount of information displayed for the selected search result as the selection time increases (element 570). For example, search application 130 may retrieve additional data and expand the graphical trend for the selected stock for the months of October through December, July through December, etc., as the analyst continues to leave the mouse pointer over the stock associated with match result 140.

Another embodiment is implemented as a program product for implementing systems and methods described with reference to FIGS. 1-5. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, or store, the program for use by or in connection with the instruction execution system, apparatus, or device.

The medium can be an electronic, magnetic, optical, electromagnetic, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private Or public networks. Modems, cable, modem, and Ethernet adapter cards are just a few of the currently available types of network adapters.

It will be apparent to those skilled in the art having the benefit of this disclosure that the present disclosure contemplates dynamically expanding the amount of information displayed with search or query results. It is understood that the form of the embodiments shown and described in the detailed description and the drawings are to be taken merely as examples. It is intended that the following claims be interpreted broadly to embrace all variations of the example embodiments disclosed.

Although the present disclosure and some of its advantages have been described in detail for some embodiments, it should be understood that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to, include within their scope such processes, machines, manufacture, compositions of matter, means, methods, or steps.

What is claimed is:

1. A method for viewing information of a search, the method comprising:
    presenting, using a processor, a plurality of search results via a browser application, wherein each search result of the plurality of search results comprises a link to a web page, and wherein the plurality of search results is presented in response to a request of the search, the plurality of search results being associated with one or more search terms of the search;
    enabling, using a processor, a user to select a search result of the plurality of search results for a first period of time and a second period of time;
    determining, using a processor, a first amount of information to display in response to selection of the search result for the first period of time, the first amount of information comprising at least a portion of a web page associated with the selected search result, the at least a portion of the web page comprising one or more search terms of the search;
    determining, using a processor, a second amount of information to display in response to continued selection of the search result for the second period of time, wherein the determining the first and second amounts of information comprises determining additional amounts of information of the search result and wherein the determining the second amount of information involves an expansion of the first amount of information, the second amount of information being presented in response to a user selecting a search term presented as part of the first amount of information, the second amount of information comprising contextual information for the search term, the contextual information comprising one or more additional lines of textual information located on the web page after the selected search term;
    expanding, dynamically, using a processor, the amount of information displayed, and displaying the second amount of information subsequent to and in addition to the first amount of information, wherein the first amount of information and the second amount of information are displayed together after expanding the amount of information displayed; and
    determining, using a processor, an expansion rate for the amount of information displayed, the expansion rate determining an amount of information displayed for a determined amount of time, wherein the expansion rate increases as the determined amount of time increases such that information is progressively expanded at a faster rate while the user selects the search result without any additional actions performed by the user.

2. An apparatus, comprising:
    random access memory (RAM);
    a display generator to display results of a search of the Internet via a browser application, wherein the results comprise links to web pages and text received in response to at least one search term entered in the browser application, the plurality of search results being associated with one or more search terms of the search, and wherein the RAM stores the results;
    a selection sensor to sense when a user selects one of the results, wherein the selection sensor is arranged to measure a period of time that the user selects the one of the results; and
    a result expander to display amounts of information for the one of the results, wherein the amounts of information displayed increases as the period of time increases such that information is added to the displayed amounts of information, and the increasing amounts of information include increasing amounts of context information associated with the at least one search term, the at least one search term being received from a web page associated with the one of the results and selected by the user, the context information comprising one or more additional lines of textual information located on a web page after the selected search term, and wherein the result expander is arranged to increase the amounts of context information displayed at an increasing rate as the period of time increases and to determine an expansion rate for the amount of information displayed, the expansion rate determining an amount of information displayed for a determined amount of time, wherein the expansion rate increases as the determined amount of time increases such that information is progressively expanded at a faster rate while the user selects the search result without any additional actions performed by the user.

3. The apparatus of claim 2, further comprising a result buffer to store the context information for the expansion.

4. The apparatus of claim 2, further comprising at least one of a mouse, a stylus, and a touch-sensitive screen, the at least one to operate in conjunction with the selection sensor.

5. The apparatus of claim 2, further comprising a processor, a keyboard, and a network communications device, and at least one of a hard disk and a flash memory device.

6. The apparatus of claim 5, wherein the apparatus comprises one of a laptop computer, a desktop computer, and a portable computing device.

7. The apparatus of claim 2, wherein the selection sensor comprises an input device arranged to work in conjunction with a pointer of the display generator.

8. The apparatus of claim 2, wherein the result expander comprises a processor executing operational code for the device, the operational code comprising routines to receive images and display the images around the one of the results with the increasing amounts of context information.

9. The method of claim 1, wherein the expansion rate comprises a linear expansion rate such that the amount of information displayed is the same for a different determined amount of time.

10. The method of claim 1, wherein the expansion rate comprises a nonlinear expansion rate such that the amount of information displayed is different for a different determined amount of time.

11. The method of claim 1, wherein expanding the amount of information displayed comprises retrieving information from a result buffer, the result buffer storing additional information associated with a search result, the additional information being stored in the result buffer in response to the search request.

12. The method of claim 1, further comprising generating text-to-speech sounds for the information displayed for a selected search result.

13. The method of claim 1, wherein the information displayed comprises contextual information, the contextual information being associated with one or more selected search terms of the search result.

14. A program product comprising a non-transitory computer readable medium having a computer readable program, wherein the computer readable program, when executed on a computer, causes the computer to perform the operations of:
  presenting a plurality of search results via a browser application, wherein each search result of the plurality of search results comprises a link to a web page, and wherein the plurality of search results is presented in response to a request of the search, the plurality of search results being associated with one or more search terms of the search;
  enabling a user to select a search result of the plurality of search results for a first period of time and a second period of time;
  determining a first amount of information to display in response to selection of the search result for the first period of time, the first amount of information comprising at least a portion of a web page associated with the selected search result, the at least a portion of the web page comprising one or more search terms of the search;
  determining a second amount of information to display in response to continued selection of the search result for the second period of time, wherein the determining the first and second amounts of information comprise determining additional amounts of information of the search result and wherein the determining the second amount of information involves an expansion of the first amount of information, the second amount of information being presented in response to a user selecting a search term presented as part of the first amount of information, the second amount of information comprising contextual information for the search term, the contextual information comprising one or more additional lines of textual information located on the web page after the selected search term;
  expanding, dynamically, the amount of information displayed, and displaying the second amount of information subsequent to and in addition to the first amount of information, wherein the first amount of information and the second amount of information are displayed together after expanding the amount of information displayed; and
  determining an expansion rate for the amount of information displayed, the expansion rate determining an amount of information displayed for a determined amount of time, wherein the expansion rate increases as the determined amount of time increases such that information is progressively expanded at a faster rate while the user selects the search result without any additional actions performed by the user.

15. The program product of claim 14, wherein the expansion rate comprises a linear expansion rate such the amount of information displayed is the same for a different determined amount of time.

16. The program product of claim 14, wherein the expansion rate comprises a nonlinear expansion rate such that the amount of information displayed is different for a different determined amount of time.

17. The program product of claim 14, wherein expanding the amount of information displayed comprises retrieving information from a result buffer, the result buffer storing additional information associated with a search result, the additional information being stored in the result buffer in response to the search request.

18. The program product of claim 14, further comprising generating text-to-speech sounds for the information displayed for a selected search result.

* * * * *